United States Patent
Schmitt et al.

(10) Patent No.: US 7,509,301 B2
(45) Date of Patent: Mar. 24, 2009

(54) SYSTEMS AND METHODS FOR DATA PROCESSING

(75) Inventors: Winfried Schmitt, Walldorf (DE);
Helmut Hofmann, Walldorf (DE);
Andreas Balzar, Heidelberg (DE)

(73) Assignee: SAP AG, Walldorf (DE)

( * ) Notice: Subject to any disclaimer, the term of this patent is extended or adjusted under 35 U.S.C. 154(b) by 354 days.

(21) Appl. No.: 10/854,169

(22) Filed: May 27, 2004

(65) Prior Publication Data

US 2005/0027675 A1    Feb. 3, 2005

(30) Foreign Application Priority Data

May 28, 2003    (EP)   ................... 03012032

(51) Int. Cl.
*G06F 7/00*    (2006.01)
*G06F 17/30*    (2006.01)
*G06F 17/00*    (2006.01)

(52) U.S. Cl. ................ 707/2; 707/4; 707/100
(58) Field of Classification Search ........ 707/2
See application file for complete search history.

(56) References Cited

U.S. PATENT DOCUMENTS

| | | | | |
|---|---|---|---|---|
| 4,479,196 A | | 10/1984 | Ferrer et al. | |
| 5,717,911 A | * | 2/1998 | Madrid et al. | 707/2 |
| 5,742,806 A | * | 4/1998 | Reiner et al. | 707/3 |
| 6,161,103 A | * | 12/2000 | Rauer et al. | 707/4 |
| 6,226,635 B1 | * | 5/2001 | Kataria | 707/4 |
| 6,341,277 B1 | | 1/2002 | Coden et al. | |
| 6,353,820 B1 | * | 3/2002 | Edwards et al. | 707/2 |
| 6,704,726 B1 | * | 3/2004 | Amouroux | 707/4 |

(Continued)

FOREIGN PATENT DOCUMENTS

WO    W/O 02/080026 A1    10/2002

OTHER PUBLICATIONS

Web definition for the word "rule" : http://www.google.com/search?hl=en&rls=GGLD,GGLD:2004-30,GGLD:en&defl=en&q=define:rule&sa=X&oi=glossary_definition&ct=title.*

(Continued)

*Primary Examiner*—Mohammad Ali
*Assistant Examiner*—Patrick A Darno
(74) *Attorney, Agent, or Firm*—Finnegan, Henderson, Farabow, Garrett & Dunner, L.L.P.

(57) ABSTRACT

Systems and methods are provided for data processing. As disclosed herein, such systems and methods may include providing a data model with a set of entity types and set of attributes for each entity type, providing customizing data for the data model, the customizing data indicating data sources for the attributes and describing data structures being provided by the data sources, querying the attribute data for at least a first attribute of the set of attributes of one of the entity types, determining from the customizing data, if a single data source for the first attribute data of the one of the entity types is available, if such a single data source is not available, determining at least first and second ones of the data sources which in combination comprise the first attribute data of the one of the entity types, generating a sub-query for each one of the at least first and second data sources, and combining the results of the sub-queries to provide a query result.

12 Claims, 3 Drawing Sheets

U.S. PATENT DOCUMENTS

| | | | |
|---|---|---|---|
| 6,954,748 B2 * | 10/2005 | Dettinger et al. | 707/2 |
| 7,139,745 B2 * | 11/2006 | Nakamura et al. | 707/2 |
| 2002/0032676 A1 | 3/2002 | Reiner et al. | |
| 2004/0153441 A1 * | 8/2004 | Dettinger et al. | 707/3 |

OTHER PUBLICATIONS

Web definition for the word "method" : http://www.google.com/search?hl=en&rls=GGLD,GGLD:2004-30,GGLD:en&defl=en&q=define:method&sa=X&oi=glossary_definition&ct=title.*

ACM Transactions on Database Systems, vol. 1, No. 1, Mar. 1976, Peter Pin-Shan Chen "The Entity-Relationship Model-Toward a Unified View of Data," pp. 9-36.

"A Guide to SQL," Philip J. Pratt, Boyd & Fraser Pub. Co., Feb. 1995, ISBN 0877095205, title page and table of contents.

* cited by examiner

SYSTEMS AND METHODS FOR DATA PROCESSING

BACKGROUND OF THE INVENTION

1. Field of the Invention

The present invention generally relates to the field of data processing and systems and methods for data processing. More particularly, and without limitation, the invention relates to data models and query processing.

2. Background Information

Data models, such as entity-relationship-models, are commonly used for database design. A data model is a conceptual description of data objects, i.e., entity types, their attributes, and the relationships between them. There are different types of data models, depending on the data structures to be defined, such as a relational data model.

ACM Transactions on Database Systems, Volume 1, No. 1, March 1976, Peter Pin-Shan Chen "The Entity-Relationship Model—Toward a Unified View of Data", pages 9-36 shows a data model. This model incorporates some of the important semantic information about the real world serving as a tool for database design.

From U.S. Pat. No. 4,479,196, to Ferrer et al., a diagrammatic technique to represent an entity relationship model is known for usage in a database system. This technique is directed to represent databases in a form that is readily processed and efficiently utilized by digital computers.

Large applications can be based on very complex data models. Searches are usually performed by using structured query language (SQL) expressions. For more information on the use of structured query language, see "A Guide to SQL", Philip J. Pratt, Boyd & Fraser Pub Co, February 1995, ISBN: 0877095205. Search expressions may be quite complex and their results may be relied upon to produce appropriate reports within the database application.

The data of a data model can be stored on a single data processing system or it can be stored on various distributed internal and/or external data sources. A disadvantage of distributed data processing in which various kinds of internal and/or external data sources are relied on is that each individual data source may require a dedicated interface. This makes prior art distributed data processing systems difficult and costly to implement. A further disadvantage is a lack of flexibility and high maintenance costs.

SUMMARY OF THE INVENTION

Consistent with embodiments of the invention, systems and methods are provided for data processing. In accordance with one embodiment, systems and methods are provided which rely on a data model having a set of entity types and a set of attributes for each entity type. As disclosed herein, the data model can be adapted to a customer's needs by customization. The customization may be stored by means of customizing data that indicates the internal and/or external data sources for the attributes and the data structures provided by these internal and/or external data sources.

According to one embodiment, when a query is processed it is first determined whether the query can be performed by using a single data source. If such a data source is not available, a set of data sources is determined. In such a case, the combination of the data sources contains the information requested by the query. For processing the query, it may be split up into a number of sub-queries and the results of the sub-queries may be combined to provide the query result.

The various embodiments can include and/or exclude different aspects, features and/or advantages, where applicable. In addition, various embodiments can combine one or more aspects or features of other embodiments, where applicable.

It is to be understood that both the foregoing general description and the following detailed description are exemplary and explanatory only and are not restrictive of the invention, as claimed.

BRIEF DESCRIPTION OF THE DRAWINGS

The embodiments will be described in greater detail by making reference to the drawings, in which.

DETAILED DESCRIPTION

The following detailed description of embodiments of the present invention refers to the accompanying drawings. Where appropriate, the same reference numbers in different drawings refer to the same or similar elements.

Figure 1:
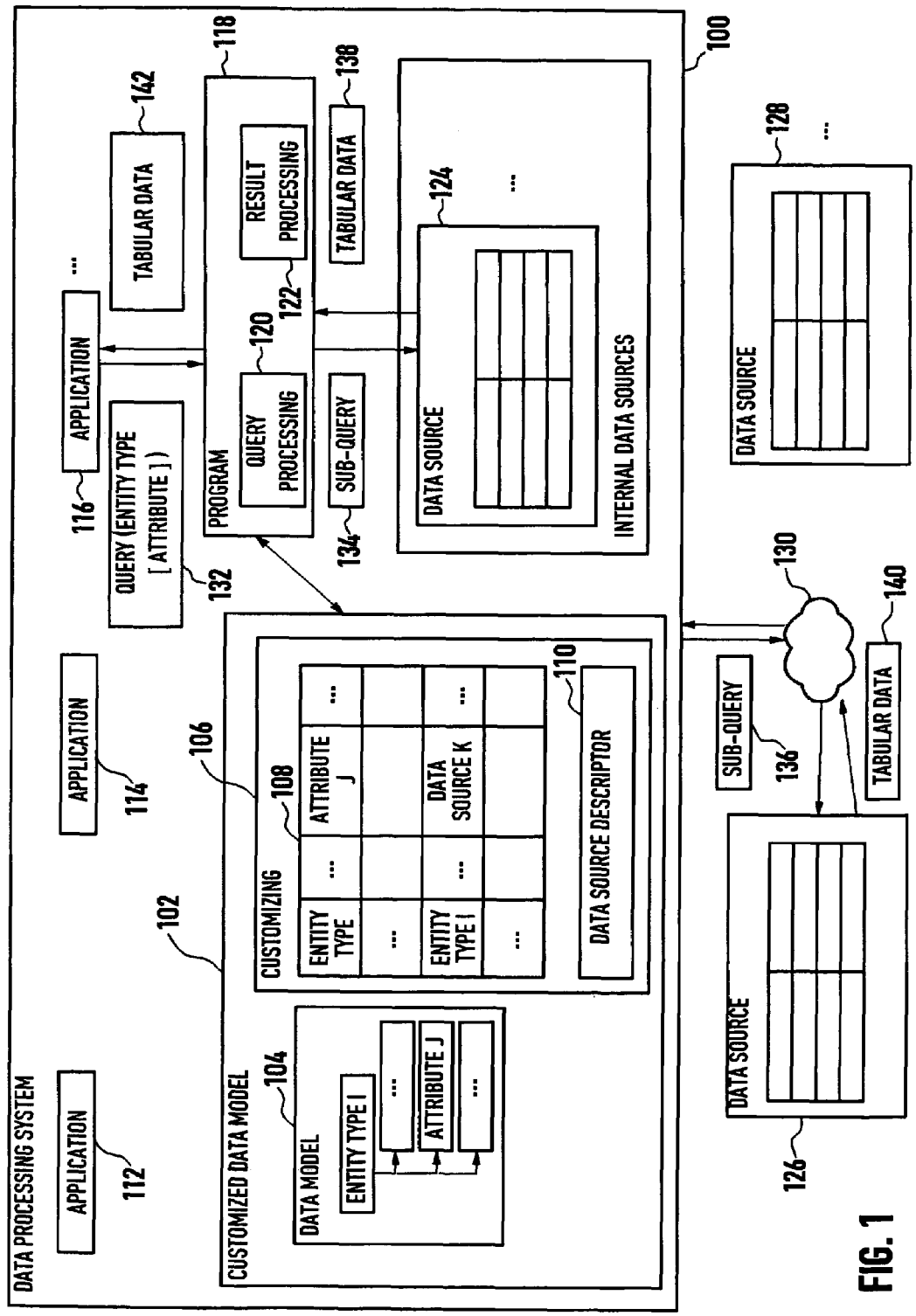
FIG. 1 is a block diagram of an embodiment of a data processing system consistent with the present invention.

FIG. 1 illustrates an exemplary data processing system 100, consistent with an embodiment of the invention. As shown in FIG. 1, data processing system 100 includes a customized data model 102. Customized data model 102 may be based on a generic data model 104 which encompasses a number of entity types, i.e., entity type 1, entity type 2, ... entity type i. Each one of the entity types may have a set of attributes. For example, entity i has attribute 1, attribute 2, ... attribute j, etc.

Customized data model 102 includes customizing data 106. Customizing data 106 includes table 108 for identification of data sources for attributes. In the example considered here, table 108 has one row for each entity type. Each data field of the role may indicate a data source for one of the attributes of the particular entity type. For example, row i of table 108 contains entries for entity i, i.e., the data sources for the attributes of entity type i. As indicated in FIG. 1, data source k is the data source for attribute j of entity type i.

Further, customizing data 106 may include a data source descriptor 110, which describes the data structures being provided by the data sources of table 108.

As shown in FIG. 1, data processing system 100 may also comprise a number of application programs 112, 114, 116, etc., which may be used for various data processing purposes of the data contained in the customized data model 102. Program 118 may serve as an interface between the application programs 112, 114, 116, etc., and customized data model 102. Program 118 may include a query processing module 120 and a result processing module 122.

Data processing system 100 may also include a number of internal data sources, i.e., data source 124, and/or may be coupled to external data sources 126, 128, etc., via a computer network 130, such as the Internet. The data sources may comprise database tables, XML files, web-services, method or function calls, EDI documents, or SOAP objects In operation, one of the application programs, such as application program 116, sends query 132 to program 118. Query 132 may specify at least one entity type and one attribute of the specified entity type of data model 104. For example, query 132 may be issued by application 116 in order to obtain attribute data for attribute j for entity type i.

Query 132 is processed by query processing module 120. Query processing module 120 determines the data sources and their data structures that are available for providing the requested data from customizing data 106. If there is a single database that can provide the requested data, program 118 forwards query 132 to that database.

If such a database is not available, query processing module 120 determines a set of data sources, which in combination, contain the information requested by query 132. In this case, query processing module 120 generates a sub-query for each one of the data sources, which in combination, contain the requested data.

For example, internal data source 124 and external data source 126 may have been identified to contain in combination the information as requested by query 132. In this instance, sub-query 134 and sub-query 136 are generated. Sub-query 134 may be entered into internal data source 124, which in response, provides tabular data 138. Likewise sub-query 136 is sent over computer network 130 to data source 126, such as by means of a HTTP request. In response, data source 126 provides tabular data 140 that is transmitted over computer network 130 to data processing system 100, such as, for example, program 118.

Result processing module 122 combines the information contained in tabular data 138 and 140 in order to provide the tabular data 142 containing the information requested by query 132.

Program 118 can be used as an interface for various application programs 112, 114, 116, etc. These application programs need not have knowledge of the location of data sources for attribute data and the data structures provided by these data sources. This information may be encapsulated in customized data model 102 and relied upon by program 118 for query processing. This generic approach enables an efficient administration of data processing system 100, as well as an efficient change management. For example, data sources may be added or replaced by making corresponding entries into table 108 and into data source descriptor 110.

As an alternative to fixed assignments of data sources to attributes, a rule base can be utilized. In the rule base, a set of rules specifies the assignments of attributes of entity types to data sources.

Figure 2:
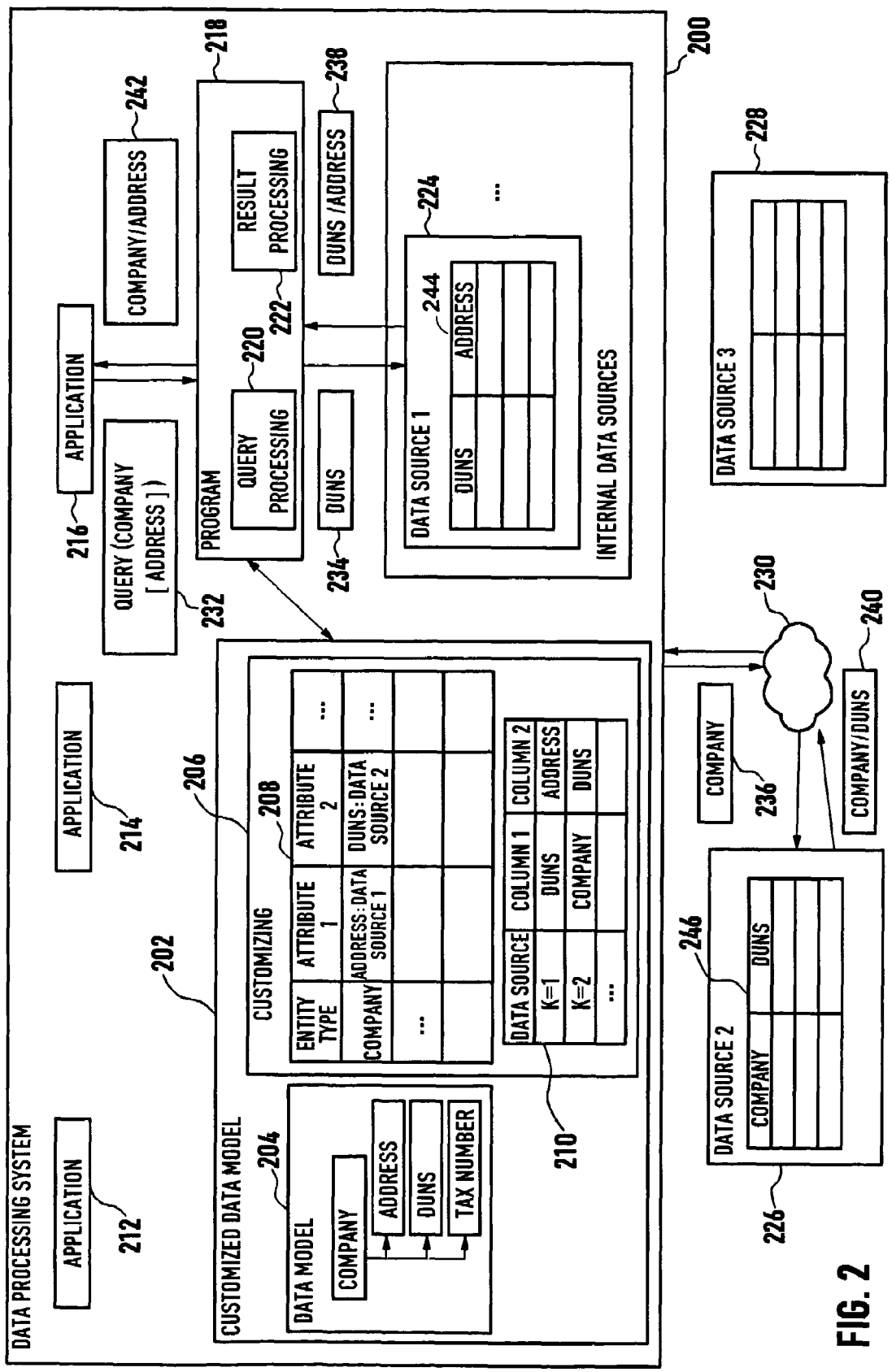
FIG. 2 is a block diagram of a more detailed embodiment of a data processing system consistent with the present invention.

FIG. 2 shows another exemplary data processing system 200, consistent with an embodiment of the invention. Elements of the embodiment of FIG. 2 that are similar or correspond to elements of the embodiment of FIG. 1 are designated by like reference numerals having added 100.

In the embodiment of FIG. 2, generic data model 204 has an entity type "company" containing company related data. These data are attributive data "address", Dun and Bradstreet Number "DUNS", and "tax number."

Customizing data 206 includes a table 208 for identifying the data sources for the attributive data of entity type "company" and other entity types which are contained in data model 204, but not shown in FIG. 2 for convenience of explanation.

Data source k=1 (i.e., internal data source 224), is entered in table 208 as the data source for attribute 1, (i.e., attribute "address" of entity type "company"). Data source k=2, (i.e., external data source 226), is entered in table 208 as the data source for attribute 2, (i.e., DUNS, for entity type "company").

Data source descriptor 210 may have an entry for each one of the data sources and may describe the data structure of each data source. In the example considered here, data source k=1 has a column for DUNS and a column for the address of the company with the DUNS. Data source k=2 has one column for the company name(s) and another column for the one or more DUNS related to the company name(s). The corresponding database tables 244 of data source 224 (k=1) and database table 246 of data source 226 (k=2) are shown in FIG. 2.

In operation, application program 216 may issue query 232. In the example of FIG. 2, query 232 is a request for address data of all companies. When query 232 is received by program 218, query processing module 220 checks customizing data 206 for the availability of a data source containing the addresses for all companies. If a data structure is not available in accordance with data source descriptor 210, query processing module 220 needs to determine a set of data sources which in combination contain the information requested in query 232. In the example considered here, this set of data sources consists of, for example, data sources k=1 and k=2.

Next, query processing module 220 generates sub-queries 234 and 236 for each one of the data sources of the identified set of data sources.

Sub-query 236 is directed towards obtaining the DUNS numbers for all companies. The corresponding tabular data 240 is received from data source 226 via computer network 230. The DUNS numbers contained in tabular data 240 are used by query processing module 220 to generate query 234 requesting the addresses of the companies having the DUNS numbers received by means of tabular data 240. In response, data source 224 provides tabular data 238 containing the addresses of the companies having the DUNS numbers of query 234.

Alternatively, query 234 is directed towards obtaining all addresses being associated to DUNS numbers in data source 224.

Result processing module 222 combines tabular data 240 and 238 in order to provide tabular data 242 relating company names to company addresses. This combination is performed by using the DUNS numbers that unequivocally identify the companies as a link between tabular data 240 and tabular data 238.

Figure 3:
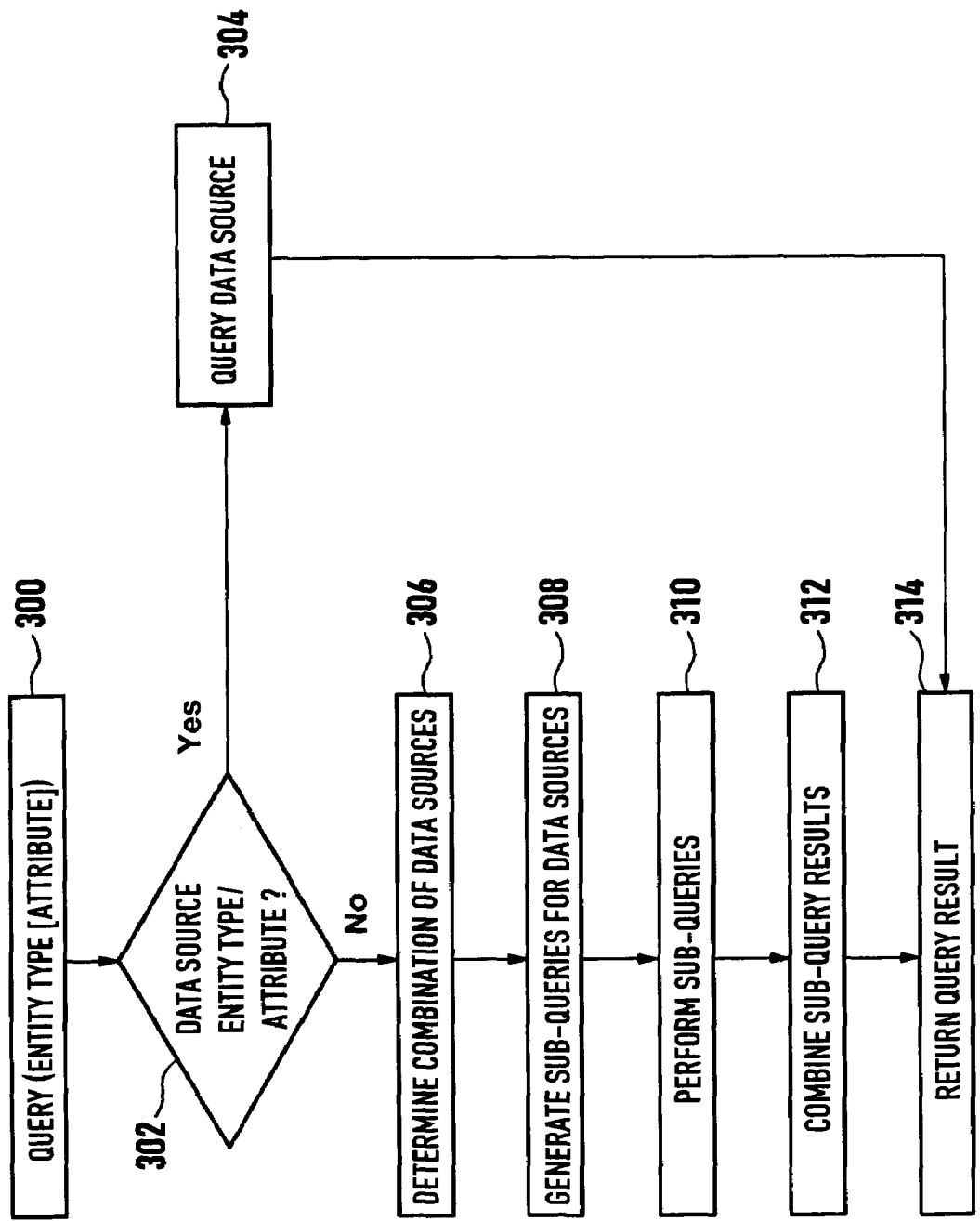
FIG. 3 is illustrative of an embodiment of a method consistent with the present invention.

FIG. 3 illustrates a flow chart of an exemplary method, consistent with an embodiment of the invention. The exemplary method of FIG. 3 may be used in combination with data processing systems, such as those presented in FIGS. 1 and 2.

In stage 300, a query is entered. In accordance with one embodiment, the query specifies at least one attribute for at least one entity type. In other words, the query is directed towards obtaining certain attribute data for a certain entity type as defined in the customized data model.

In stage 302, it is determined whether there is a single data source that is able to provide the entity type/attribute information. If this is the case, the query is forwarded to that data source and the query is performed in stage 304.

If the contrary is the case, a sub-set of the available set of data sources is determined in stage 306, which in combination, contain the information requested in the query. In stage 308, sub-queries are generated for each data source of the sub-set. In stage 310, the sub-queries are performed, and the sub-query results are provided to the common interface program where the sub-query results are combined in stage 312. This yields the query result that is returned to the requesting application program.

In accordance with another embodiment of the invention, the principles described above for a query are used for the writing of data. Further, consistent with the invention, the term "attribute" as used herein may also encompass the entity type, i.e., the identifier of an entity type.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Additionally, although aspects of the invention are described for being stored in memory, one skilled in the art will appreciate that these aspects can also be stored on other types of computer-readable media, such as secondary storage devices, for example, hard disks, floppy disks, CD-ROM, or other forms of RAM or ROM.

Computer programs based on the written description and flow charts of this invention are within the skill of an experienced developer. The various programs or program modules can be created using any of the techniques known to one skilled in the art or can be designed in connection with existing software. For example, programs or program modules can be designed in or by means of Java, C++, HTML, XML, or HTML with included Java applets or in SAP R/3 or ABAP. One or more of such modules can be integrated in existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

Accordingly, other embodiments of the invention will be apparent to those skilled in the art from consideration of the specification and practice of the invention disclosed herein. It is therefore intended that the specification and examples be considered as exemplary only, with a true scope and spirit of the invention being indicated by the following claims.

What is claimed is:

1. A computer implemented method comprising:
   providing a data model having a set of entity types and a set of attributes for each entity type for the set of entity types;
   providing customizing data for the data model, the customizing data indicating data sources for the attributes and describing data structures being provided by the data sources;
   receiving a query from an application program, the query requesting attribute data for at least a first attribute of the set of attributes of one of the entity types;
   processing the query by a query processing module that determines whether data sources and data structures are available based on the customizing data in the data model;
   determining, from the customizing data, if a single data source for the first attribute data of the one of the entity types is available;
   if a single data source is available, providing a query result from the single data source;
   if a single data source is not available, determining at least first and second ones of the data sources, which in combination, comprise the first attribute data of the one of the entity types;
   generating a sub-query for each one of the at least first and second data sources, a first sub-query being generated to obtain a first tabular data from the first data source and a second sub-query being generated to obtain a second tabular data from the second data source; and
   combining the results of the sub-queries from the at least first and second data sources to provide a query result;
   wherein the determination of the at least first and second data sources is made by a data source descriptor, the data source descriptor allowing replacement of a data source without making any modifications to the data source descriptor.

2. The method of claim 1, wherein one of the data structures comprises tabular data relating entity type data to attribute data of attributes of the set of attributes of the entity type, or relating second attribute data of a second attribute of the set of attributes to the first attribute data.

3. The method of claim 1, wherein the first data source relates the entity type data of the one of the entity types to second attribute data of a second attribute of the set of attributes, and wherein the second data source relates the second attribute data to the first attribute data.

4. The method of claim 1, the data sources being at least one of database tables, XML files, web-services, method or function calls, EDI documents, or SOAP objects.

5. A computer program product, stored on a digital storage medium, comprising:
   a data model having a set of entity types and a set of attributes for each entity type of the set of entity types,
   customizing data for the data model, the customizing data being indicative of data sources for the attributes and being descriptive of data structures being provided by the data sources; and
   program means for performing the method of:
   a) receiving a query from an application program, the query requesting attribute data for at least a first attribute of the set of attributes of one of the entity types;
   b) processing the query by a query processing module that determines whether data sources and data structures are available based on the customizing data in the data model;
   c) determining from the customizing data, if a single data source for the first attribute data of the one of the entity types is available;
   d) if a single data source is available, providing a query result from the single data source;
   e) if a single data source is not available, determining at least first and second ones of the data sources which in combination comprise the first attribute data of the one of the entity types;
   f) generating a sub-query for each one of the at least first and second data sources, a first sub-query being generated to obtain a first tabular data from the first data source and a second sub-query being generated to obtain a second tabular data from the second data source; and
   g) combining the results of the sub-queries from the at least first and second data sources to provide a query result,
   wherein the determination of the at least first and second data sources is made by a data source descriptor, the data source descriptor allowing replacement of a data source without making any modifications to the data source descriptor.

6. The computer program product of claim 5, wherein one of the data structures comprises tabular data relating entity type data to attribute data of attributes of the set of attributes of the entity type, or relating second attribute data of a second attribute of the set of attributes to the first attribute data.

7. The computer program product of claim 5, wherein the first data source relates the entity type data of the one of the entity types to second attribute data of a second attribute of the set of attributes, and wherein the second data source relates the second attribute data to the first attribute data.

8. A data processing system comprising:
a central processing unit;
a memory;
a data model having a set of entity types (i) and a set of attributes (j) for each entity type of the set of entity types;
customizing data for the data model, the customizing data indicating data sources (k) for the attributes and describing data structures being provided by the data sources;
means for receiving a query from an application program, the query requesting first attribute data for at least a first attribute of the set of attributes of one of the entity types;
means for processing the query by a query processing module that determines whether data sources and data structures are available based on the customizing data in the data model;
means for determining from the customizing data, if a single data source for obtaining the first attribute data being related to the one of the entity types is available;
means for providing a query result from the single data source, if a single data source is available;
means for determining at least first and second ones of the data sources which in combination comprise the first attribute data being related to the one of the entity types, if a single data source is not available;
means for generating a sub-query for each one of the at least first and second data sources, a first sub-query being generated to obtain a first tabular data from the first data source and a second sub-query being generated to obtain a second tabular data from the second data source; and
means for combining the results of the sub-queries from the at least first and second data sources to provide the query result,
wherein the determination of the at least first and second data sources is made by a data source descriptor, the data source descriptor allowing replacement of a data source without making any modifications to the data source descriptor.

9. The data processing system of claim 8, wherein the first sub-set of the data sources comprises internal data sources of the data processing system and the second sub-set of the data sources comprises external data sources.

10. The data processing system of claim 8, wherein one of the data structures comprises tabular data relating entity type data to attribute data of attributes of the set of attributes of the entity type, or relating second attribute data of a second attribute of the set of attributes to the first attribute data.

11. The data processing system of claim 8, wherein the first data source relates the entity type data of the one of the entity types to second attribute data of a second attribute of the set of attributes, and wherein the second data source relates the second attribute data to the first attribute data.

12. The data processing system of claim 8, the data sources being at least one of database tables, XML files, web-services, method or function calls, EDI documents, or SOAP objects.

* * * * *